US009732251B2

(12) United States Patent
De Boer et al.

(10) Patent No.: US 9,732,251 B2
(45) Date of Patent: Aug. 15, 2017

(54) DRIER FOR ALYKD-BASED COATING

(71) Applicant: Chemsenti Limited, London (GB)

(72) Inventors: Johannes Wietse De Boer, Leiden (NL); Ronald Hage, Leiden (NL); Karin Maaijen, Leiden (NL)

(73) Assignee: Chemsenti Limited, London (GB)

( * ) Notice: Subject to any disclaimer, the term of this patent is extended or adjusted under 35 U.S.C. 154(b) by 0 days.

(21) Appl. No.: 14/819,510

(22) Filed: Aug. 6, 2015

(65) Prior Publication Data
US 2015/0337165 A1 Nov. 26, 2015

Related U.S. Application Data

(63) Continuation of application No. PCT/GB2014/050271, filed on Jan. 31, 2014.

(30) Foreign Application Priority Data

Feb. 11, 2013 (EP) .................................... 13154850

(51) Int. Cl.
C09D 5/00 (2006.01)
C09D 167/08 (2006.01)
C08L 67/08 (2006.01)
C09D 7/12 (2006.01)
C09F 9/00 (2006.01)
C08K 5/3467 (2006.01)
C08K 5/3432 (2006.01)

(52) U.S. Cl.
CPC ............ C09D 167/08 (2013.01); C09D 5/00 (2013.01); C09D 7/1233 (2013.01); C09F 9/00 (2013.01); C08K 5/3432 (2013.01); C08K 5/3467 (2013.01)

(58) Field of Classification Search
USPC .................................................. 523/500, 515
See application file for complete search history.

(56) References Cited

U.S. PATENT DOCUMENTS

| | | | | |
|---|---|---|---|---|
| 4,659,380 | A * | 4/1987 | Winters | C09D 167/08 106/14.14 |
| 7,335,248 | B2 * | 2/2008 | Abou-Nemeh | A01N 59/16 106/15.05 |
| 8,013,044 | B2 * | 9/2011 | Hage | C09D 11/03 524/100 |
| 2001/0008932 | A1 | 7/2001 | Bakkeren et al. | |
| 2005/0245639 | A1 | 11/2005 | Oostveen et al. | |
| 2007/0117888 | A1 * | 5/2007 | Anderson | C08G 18/089 524/92 |
| 2011/0070376 | A1 * | 3/2011 | Wales | A01N 63/00 427/414 |
| 2014/0011966 | A1 * | 1/2014 | Reijnders | C08F 299/04 525/445 |

FOREIGN PATENT DOCUMENTS

| | | |
|---|---|---|
| EP | 0096207 A1 | 12/1983 |
| EP | 0902021 A2 | 3/1999 |
| EP | 1382648 A1 | 1/2004 |
| EP | 2474578 A1 | 7/2012 |
| WO | WO-91/15549 A1 | 10/1991 |
| WO | WO-00/11090 A1 | 3/2000 |
| WO | WO-03/029371 A1 | 4/2003 |
| WO | WO-03/093384 A1 | 11/2003 |
| WO | WO-2007/024592 A1 | 3/2007 |
| WO | WO-2008/003652 A1 | 1/2008 |
| WO | WO-2008/127739 A1 | 10/2008 |
| WO | WO-2011/083309 A1 | 7/2011 |
| WO | WO-2011/098583 A1 | 8/2011 |
| WO | WO-2011/098584 A1 | 8/2011 |
| WO | WO-2011/098587 A1 | 8/2011 |
| WO | WO-2012/092034 A2 | 7/2012 |
| WO | WO-2012/093250 A1 | 7/2012 |
| WO | WO-2013/092441 A1 | 6/2013 |
| WO | WO-2013/092442 A1 | 6/2013 |

OTHER PUBLICATIONS

A brochure for 5% Cobalt Hydro-CUre II by OMG Borchers GmbH, 2 pages, Downloaded on Jul. 23, 2016.*
Johan Bieleman, "Driers", Chimia, vol. 56, pp. 184-190 (2002).
Johan Bieleman, "Progress in the Development of Cobalt-free Drier Systems", Macromol. Symp., vol. 187, pp. 811-821 (2002).
Canty et al., "Drier Catalyst Activity in Organic Coatings", Ind. Eng. Chem., vol. 52, pp. 67-70 (1960).
Chaudhuri et al., "The Chemistry of 1, 4, 7-Triazacyclononane and Related Tridentate Macrocyclic Compounds", Prog. Inorg. Chem., vol. 35, pp. 329-436 (1987).
Manchanda et al., "High-valent oxomanganese clusters: structural and mechanistic work relevant to the oxygen-evolving center in photosystem II", vol. 144, pp. 1-38 (1995).
Oyman, et al., "A promising environmentally-friendly manganese-based catalyst for alkyd emulsion coatings", Polymer, vol. 45, pp. 7431-7436 (2004).
Oyman et al., "Catalytic activity of a dinuclear manganese complex (MnMeTACN) on the oxidation of ethyl linoleate", Applied Catalysis: A General, vol. 316, pp. 191-196 (2007).
Oyman et al., "Oxidative drying of alkyd paints catalysed by a dinulcear manganese complex (MnMeTACN)", Surface Coatings International Part B: Coatings Transactions, vol. 88, pp. 269-275 (2005).

(Continued)

Primary Examiner — Tae H Yoon
(74) Attorney, Agent, or Firm — McCarter & English, LLP; Yu Lu; Wei Song

(57) ABSTRACT

The present invention relates to a formulation comprising an oxidatively curable alkyd-based resin and a chelating agent. More particularly, the formulation is essentially absent an amount of cations selected from the group consisting of manganese, iron, cobalt, vanadium and copper ions, which ions, if present in the formulation, will form together with the chelant a metal drier capable of accelerating oxidative curing. The invention also provides a method of making the formulation and a method of contacting the formulation with a composition comprising transition metal ions so as to provide a composition comprising an oxidatively curable alkyd-based resin and a complex of the transition metal ion and the chelating agent.

12 Claims, 2 Drawing Sheets

(56) References Cited

OTHER PUBLICATIONS

Remy van Gorkum et al, "The oxidative drying of alkyd paint catalysed by metal complexes", Coordination Chemistry Reviews, vol. 249, pp. 1709-1728 (2005).
Remy van Gorkum et al., "Fast Autoxidation of Ethyl Linoleate Catalyzed by [Mn(acac)3] and Bipyridine: A Possible Drying Catalyst for Alkyd Paints", Inorg. Chem., vol. 43, No. 8, pp. 2456-2458 (2004).
Weissenborn et al., "Emulsification, drying and film formation of alkyd emulsions", Prog. Org. Coat., vol. 40, pp. 253-266 (2000).
Wieghardt et al., "Synthesis, Crystal Structures, Reactivity, and Magnetochemistry of a Series of Binuclear Complexes of Mangnese (II), and -(IV) of Biological Relevance. The Crystal Structure of [L'Mn$^{IV}$(μ-O)$_3$Mn$^{IV}$L'](PF$_6$)$_2$H$_2$O Containing an Unprecedented Short Mn⋯Mn Distance of 2.296A", J. Am. Chem. Soc., vol. 110, pp. 7398-7411 (1988).
Final Office Action dated Feb. 15, 2017 issued in U.S. Appl. No. 14/819,506, filed Aug. 6, 2015.

\* cited by examiner

DRIER FOR ALYKD-BASED COATING

REFERENCE TO RELATED APPLICATIONS

This application is a continuation application of International Application No. PCT/GB2014/050271, filed on Jan. 31, 2014; which claims priority to European Patent Application No. EP 13154850.5 filed on Feb. 11, 2013, the entire contents of each of which are incorporated herein by reference.

FIELD OF THE INVENTION

The present invention relates to a formulation comprising an oxidatively curable alkyd-based resin and a chelating agent. More particularly, the formulation is essentially absent an amount of cations selected from the group consisting of manganese, iron, cobalt, vanadium and copper ions, which ions, if present in the formulation, will form together with the chelant a metal drier capable of accelerating oxidative curing. The invention also provides a method of making the formulation and a method of contacting the formulation with a composition comprising transition metal ions so as to provide a composition comprising an oxidatively curable alkyd-based resin and a complex of the transition metal ion and the chelating agent.

BACKGROUND OF THE INVENTION

Alkyd resins are a well understood and dominant binder in many oxidatively curable paints and other solvent-based coatings. Alkyd emulsion paints, in which the continuous phase is aqueous, are also widely available commercially. Alkyd resins are produced by the reaction of polyols with carboxylic acids or anhydrides. To make them susceptible to what is commonly referred to as a drying process, some alkyd resins are reacted with unsaturated triglycerides or other source of unsaturation. Plant and vegetable oils, such as linseed oil, are frequently used as the source of triglycerides. In these drying processes, unsaturated groups, in particular carbon-carbon double bonds, can react with oxygen from the air, causing the oils to crosslink, forming a three-dimensional network, and harden. This oxidative curing process, although not drying, gives the appearance of drying and is often and herein referred to as such. The length of time required for drying depends on a variety of factors, including the constituents of the alkyd resin formulation and the amount and nature of the liquid continuous phase (e.g., solvent) in which the alkyd resin is formulated.

Film formation results from the autoxidation and polymerization chemistries that occur during the drying of alkyd-based resins. It will proceed in the absence of catalysis. However, it is customary to include in formulations of curable resins small, i.e. catalytic, quantities of optionally organic metal salts, often referred to as metal driers, which catalyze the polymerization of unsaturated material so as to form the three-dimensional network.

Driers used for solvent-based coatings typically include alkyl carboxylates, typically $C_6$-$C_{18}$ carboxylates, of metals such as cobalt, manganese, lead, zirconium, zinc, vanadium, strontium, calcium and iron. Such metal carboxylates are often referred to as metal soaps. Redox-active metals, such as manganese, iron, cobalt, vanadium and copper, enhance radical formation, and thus the oxidative curing process, whilst so-called secondary driers (sometimes referred to as auxiliary driers), such as complexes based on strontium, zirconium and calcium, enhance the action of the redox-active metals. Often these soaps are based on medium-chain alkyl carboxylates such as 2-ethyl-hexanoate. The lipophilic units in such soaps enhance the solubility of the drier in solvent-based paints and other oxidatively curable coating compositions.

As well as metal soaps, a variety of metal driers that are redox metal complexes containing organic ligands can be used as driers, for example manganese complexes comprising 2,2'-bipyridineor 1,10-phenanthroline ligands.

The formation of a skin or lumpy matter is a problem observed in many oil-based (i.e. organic solvent-based) formulations, and in particular in organic solvent-based alkyd resins, as a consequence of oxidation during storage or transportation. Oxidative polymerization reactions can thus lead to the skin formation before application, as well as the intended drying after application. As alluded to above, these polymerization reactions can be triggered by radicals generated by the action of metal-based driers, for example cobalt-, manganese- or iron-containing driers. In other words, the cause of the skin formation is often associated with the presence of metal driers.

Skin formation during manufacture and storage of air-drying paints and other coatings, in particular of alkyd-based resins, is clearly undesirable. Skin formation can lead to material losses and usage problems, such as surface irregularity after application owing to skin particles remaining in the paint.

Addition of compounds that quench the radicals formed during the storage or transportation processes reduce the skin-forming tendencies of such formulations. Many antiskinning agents are therefore antioxidants. However, addition of such antiskinning antioxidants can also slow the drying desired after application, by reducing the activity of the metal driers.

Oximes, and in particular methylethylketoxime (MEKO), are known to reduce skin formation considerably, particularly with cobalt-based driers. It is understood that the oxime binds to the metal ion during storage of the resin, thereby preventing the metal drier from reacting with oxygen and the substrate for radical formation that otherwise leads to polymerization and skin formation. Upon application of the paint or other coating as a thin layer on a surface, the MEKO can evaporate. In this way, skinning can be prevented or ameliorated, but the cobalt soap can function, after application, as a polymerization catalyst (see J H Bieleman in *Additives in Plastics and Paints, Chimia*, 56:184 (2002)).

Antiskinning agents, or ways to address the problem of skinning, other than those involving the use of oximes such as MEKO, have been described. For example, WO 00/11090 A1 (Akzo Nobel N.V.) describes the use of 1,3-diketones, pyrazoles and imidazoles to reduce the skinning properties; WO 2007/024592 A1 (Arkema Inc.) describes the use of isoascorbate as an antiskinning agent and a co-promoter of metal-based driers; and WO 2008/127739 A1 (Rockwood Pigments NA, Inc.) describes the use of hydroxylamine as an antiskinning agent. Whilst such additives reduce the tendency towards skinning, they can lead to decreased performance of the metal drier if their degree of incorporation is too great and they do not evaporate sufficiently during the coating (e.g., paint) application.

Whilst cobalt driers have been employed for many years as paint driers, there is a desire to develop alternatives, not least since cobalt soaps may need to be registered as carcinogenic materials. Iron- and manganese-based paint driers in particular have received considerable attention in recent years in the academic and patent literature as alternatives to cobalt-based driers. For some recent scientific publications addressing this topic in detail see publications by J H Bieleman (in *Additives in Plastics and Paints, Chimia,* infra)); J H Bieleman (*Marcomol. Symp.,* 187:811 (2002)); and R E van Gorkum and E Bouwman (*Coord. Chem. Rev.,* 249:1709 (2005)).

WO 03/093384 A1 (Ato B.V.) describes the use of reducing biomolecules in combination with transition-metal salts or complexes based on pyrazoles, aliphatic and aromatic amines, 2,2'-bipyridine, 1,10'-phenanthroline and 1,4,7-trimethyl-1,4,7-triazacyclononane ($Me_3TACN$).

Oyman et al. describe the oxidative drying of alkyd paints by $[Mn_2(\mu\text{-}O)_3(Me_3tacn)_2](PF_6)_2$ (Z O Oyman et al., *Surface Coating International Part B—Coatings Transaction,* 88:269 (2005)). WO 2011/098583 A1, WO 2011/098584 A1 and WO 2011/098587 A1 (each DSM IP Assets B.V.) describe the use of a variety of dinuclear manganese complexes with $Me_3TACN$ as ligand for paint drying.

WO 03/029371 A1 (Akzo Nobel N.V.) describes the use of complexes comprising Schiff base compounds to enhance the drying of coatings, in which complexes at least one solubilizing group is covalently bound to the organic ligand.

WO 2008/003652 A1 (Unilever PLC et al.) describes the use of tetradentate, pentadentate or hexadentate nitrogen ligands bound to manganese and iron as siccative for curing alkyd-based resins.

WO 2012/092034 A2 (Dura Chemicals, Inc.) describes the use of a transition metal and a porphyrin based ligand as a siccative for resin compositions.

The use of mixtures of metal salts and ligands to enhance drying of paint formulations is known. For example, W H Canty, G K Wheeler and R R Myers (*Ind. Eng. Chem.,* 52:67 (1960)) describe the drying capability of a mixture of 1,10-phenanthroline (phen) and Mn soap, which is similar to that of prepared Mn-phen complexes. Mixtures of 2,2'-bipyridine (bpy) and manganese soaps show a better drying performance than manganese soaps without bpy (see P K Weissenborn and A Motiejauskaite, *Prog. Org. Coat.,* 40:253 (2000)). Also, R van Gorkum et al. (*Inorg. Chem.,* 43:2456 (2004)), describe that the addition of bpy to $Mn(acetylacetonate)_3$ gives an acceleration in the drying performance, and attribute this to the formation of manganese-bipyridine complexes. The use of manganese complexes with acetylacetonate and bidentate nitrogen donor ligands in paint drying has also been described in EP 1382648 A1 (Universiteit Leiden).

In WO 2012/093250 A1 (OMG Additives Limited) it is described that, by contacting an aqueous solution of transition metal ions and polydentate ligands with alkyd-based formulations, the resultant formulation shows reduced skinning tendency as compared with the introduction of metal ions and polydentate ligands in nonaqueous media.

Accordingly, there remains a need in the field of oxidatively curable alkyd-based formulations to be able to provide a formulation which, on the one hand, ameliorates the problem of skinning upon storage of such formulations that comprise metal-based dryers, and on the other hand requires less modification by the manufacturers of oxidatively curable coating compositions suitable for application than existing oxidatively curable alkyd-based formulations that are essentially absent metal-based dryers.

SUMMARY OF THE INVENTION

The present invention is based on the recognition of the technical advantageousness of providing an oxidatively curable alkyd-based resin formulation comprising an amount of a chelating agent (used interchangeably herein with the term "chelant") that is capable of chelating at least one transition metal ion through either two or three nitrogen atoms, but which formulation is essentially absent manganese, iron, cobalt, vanadium and copper ions. These, ions, if present in the formulation, can form together with the chelant a metal drier capable of accelerating oxidative curing.

In this way, a manufacturer of an alkyd-based resin formulation suitable for oxidative curing can include a chelant capable of chelating at least one transition metal ion (typically one selected from the group consisting of manganese, iron, cobalt, vanadium and copper ions) through either two or three nitrogen atoms in an amount appropriate for a given oxidatively curable alkyd-based resin formulation. Each type of oxidatively curable alkyd-based resin can, and typically does, have different sensitivity towards radical curing and may thus require a particular concentration of a metal drier for optimal curing. However, to determine the appropriate concentration in practice is not straightforward, since a metal drier, for example a manganese- or iron-based catalyst, can initiate radical curing before the coating composition (e.g., paint) comprising an oxidatively curable alkyd-based resin formulation (and other components) can be applied, leading to undesirable degradation and/or hardening of the resin formulation. In contrast, a manufacturer of an oxidatively curable alkyd-based resin formulation, as opposed to the manufacture of a fully formulated coating composition comprising such an oxidatively curable alkyd-based resin formulation, can determine the optimum amount of metal drier for a given alkyd-based resin formulation and add to batches of it a suitable amount of chelant (but not the transition metal ions that allow formation of a catalytically active drier). An appropriate quantity of transition metal ions can then be added to the resultant formulation by, for example, a manufacturer of a coating composition, along with other components to make a fully formulated oxidatively curable coating composition.

Mixing of appropriate chelants with alkyd-based resin formulations in the essential absence of transition metal cations which, if present, render these chelants catalytically active as metal driers, affords formulations at least less susceptible to skinning or instability without the requirement to add antiskinning agents and/or to take other specific measures to avoid skinning.

Viewed from a first aspect, therefore, the invention provides a formulation comprising an oxidatively curable alkyd-based resin and a chelant capable of chelating at least one transition metal ion through either two or three nitrogen atoms, which formulation comprises less than 0.001% by weight of ions of each of manganese, iron, cobalt, vanadium and copper.

Viewed from a second aspect, the invention provides a method of preparing a formulation according to the first aspect of the invention, the method comprising contacting a composition comprising an oxidatively curable alkyd-based resin and a composition comprising the chelant.

Viewed from a third aspect, the invention provides a method of preparing an oxidatively curable coating composition, comprising contacting a formulation according to the first aspect of the invention with a composition comprising transition metal cations, typically manganese, iron, cobalt, vanadium and copper ions.

Viewed from a fourth aspect, the invention provides a kit comprising a formulation according to the first aspect of the invention and, separately, a composition comprising transition metal ions selected from the group consisting of manganese, iron, cobalt, vanadium and copper ions.

Further aspects and embodiments of the present invention will be evident from the discussion that follows below.

DETAILED DESCRIPTION OF THE INVENTION

Figure 1:
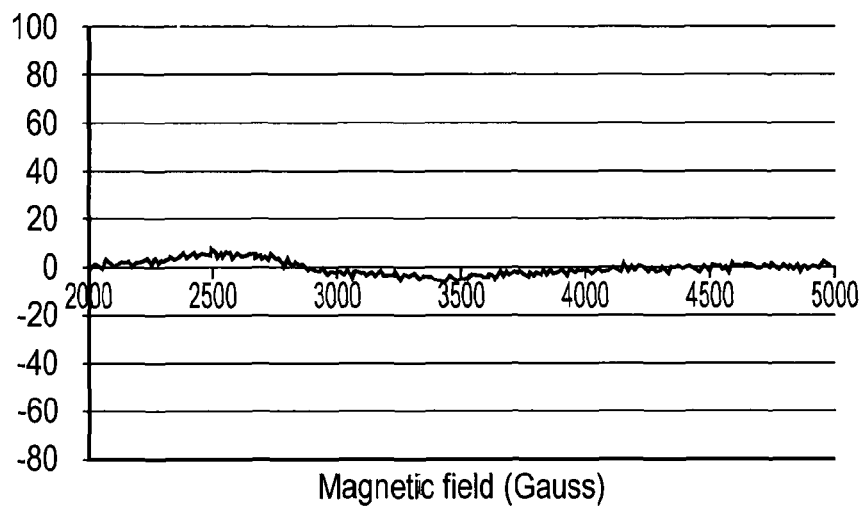
FIG. 1 shows an ESR spectrum of alkyd resin containing Me$_3$-TACN (see Comparative Example 2a).

As summarized above, the present invention is based on the recognition of the technical advantageousness of providing an oxidatively curable alkyd-based resin formulation comprising a specific amount of a chelant capable of chelating at least one transition metal ion through either two or three nitrogen atoms, but which formulation is essentially absent concentrations of manganese, iron, cobalt, vanadium and copper cations that would generate an effective concentration of a metal drier comprising such a chelant or chelants and such transition metal cations. An appropriate quantity of suitable transition metal cations can be added after preparation of such a formulation, for example when an oxidatively curable coating composition comprising such a formulation is prepared.

As noted above, alkyd resins are a well-understood binder class used in film-forming coating compositions. The term coating composition is to be interpreted broadly and embraces, for example, varnishes, primary coats, filling pastes and glazes. Coating compositions may be solvent-based or water based, e.g. emulsions. Typical coating compositions include solvent-based air-drying coatings and/or paints for domestic use. According to particular embodiments of the present invention, the coating compositions described herein are paints. The formulations of the invention (including the fully formulated oxidatively curable coating compositions described herein) may comprise inks, for example a metal plate ink, lithographic ink, relief printing ink, screen ink or offset overprinting ink.

By oxidatively curable alkyd-based resin formulations is meant herein liquids that form a continuous solid coating as a consequence of the course of oxidative reactions (curing) and generally evaporation of a liquid continuous phase (generally solvent).

Typically, curing results in formation of cross-linkages and other bond formations through reactions involving unsaturated components within alkyd-based resin formulations.

In alkyd-based resin formulations, also referred to herein as alkyd-based formulations, the major binder present is an alkyd. By binder is meant in the art and herein the film-forming (curable) component within curable compositions, i.e. the component within the compositions that forms the desired three-dimensional network upon curing.

Typically the curable component of an oxidatively curable composition (e.g., a formulation of the invention) will comprise between about 1 and about 98% by weight, for example between about 1 and about 90% by weight of the total weight of the composition, e.g., between about 20 and about 70% by weight of the total weight of the composition. At least 50% by weight of the oxidatively curable portion (i.e. of the binder) in an oxidatively curable alkyd-based resin, i.e. from about 50% by weight to about 100% by weight, is curable alkyd resin. Typically, at least 75% by weight of the binder in an oxidatively curable alkyd-based resin, i.e. from about 75% by weight to about 100% by weight (e.g., from about 90% by weight to about 100% by weight), is curable alkyd resin. According to particular embodiments, about 100% by weight of the binder in an oxidatively curable alkyd-based resin is curable alkyd resin. The balance, if any, of the curable (i.e. binder) component may be, for example, curable acrylate, urethane, polybutadiene and epoxy ester resins. The skilled person is aware that introducing quantities of curable binders other than curable alkyds allows the distinct properties of such binders to be introduced to a controllable degree into the ultimate coating resultant from application of a composition, such as an oxidatively curable composition made according to the third aspect of the invention.

As described above, oxidatively curable alkyd resins are a well-understood and indeed dominant binder in many oxidatively curable paints (both for commercial and domestic use) and other coating compositions. They are employed, in particular, in solvent-based coating compositions.

Alkyds (used synonymously herein with alkyd resins) are produced by the condensation, typically polycondensation, of polyols with carboxylic acids or anhydrides. To make them susceptible to the so-called drying process, some alkyd resins (i.e. those that are oxidatively curable, present in the formulation of the invention) are reacted with unsaturated triglycerides or other source of unsaturation. Plant and vegetable oils, such as linseed oil, are frequently used as the source of triglycerides. The term oxidatively curable alkyd resin thus generally refers in the art, and herein, to polyesters modified with fatty acids. As is known in the art, alkyd resins are generally prepared via condensation polymerization reactions between three types of monomers: (i) one or more polyalcohols (also known as polyols), (ii) one or more polybasic acids (also known as polyacids); and (iii) long chain unsaturated fatty acids or triglyceride oils, which confer upon the alkyds the susceptibility towards curing.

Owing to its presence in naturally occurring oils, glycerol is a widely used polyol in the preparation of alkyds. Other examples of suitable polyhydric alcohols include: pentaerythritol, dipentaerythritol, ethylene glycol, diethylene glycol, propylene glycol, neopentyl glycol, trimethylol propane, trimethylol ethane, di-trimethylol propane and 1,6-hexane diol.

Polycarboxylic acids and the corresponding anhydrides, used to synthesize alkyds, comprise aromatic, aliphatic and cycloaliphatic components, which are generally derived from petrochemical feedstocks. Typical examples of such polyacids include: phthalic acid and its regioisomeric analogues, trimellitic acid, pyromellitic acid, pimelic acid, adipic acid, azelaic acid, sebacic acid, maleic acid, fumaric acid and tetra-hydrophthalic acid.

Suitable so-called drying and semi-drying fatty acids or mixture thereof, useful herein, are typically ethylenically unsaturated conjugated or non-conjugated $C_2$-$C_{24}$ carboxylic acids, such as oleic, ricinoleic, linoleic, linolenic, licanic acid and eleostearic acids or mixture thereof, typically used in the forms of mixtures of fatty acids derived from natural or synthetic oils.

By semi-drying and drying fatty acids is meant fatty acids that have the same fatty acid composition as the oils (i.e. the esters) from which they are derived. The classification of the oils is based on the iodine number: for a drying oil the iodine number is >140; for a semi-drying oil the iodine number is ranging between 125 and 140, and for a non-drying oil the iodine number is <125 (see "*Surface Coatings*", part 1, Chapman & Hall, London, page 55, 1993).

Typically, oxidatively curable alkyd-based formulations, both generally and according to the first aspect of the invention, are liquids. More typically still, such formulations are solvent-based, that is to say they comprise an organic solvent (which may be a mixture of solvents) for the binder and, in accordance with the first aspect of the invention, the chelant.

In other words, "solvent-based" implies to the skilled person in this context formulations that are based on organic (i.e. non-aqueous) solvents, i.e. comprising an organic solvent as a liquid continuous phase. Examples of suitable solvents include aliphatic (including alicyclic and branched) hydrocarbons, such as hexane, heptane, octane, cyclohexane, cycloheptane and isoparaffins; aromatic hydrocarbons such as toluene and xylene; ketones, e.g., methyl ethyl ketone and methyl isobutyl ketone; alcohols, such as secondary butanol, isopropyl alcohol, n-butyl alcohol and n-propyl alcohol, glycols such as propylene glycol; alcohol ethers and esters, glycol monoethers, such as the monoethers of ethylene glycol and diethylene glycol; monoether glycol acetates, such as 2-ethoxyethyl acetate; N-methylpyrrolidone; as well as mixtures thereof. Isomeric variants are included. Thus, for example, the term hexane embraces mixtures of hexanes. According to particular embodiments the term hexane embraces mixtures of hexanes. According to particular embodiments of the invention, the solvent is a hydrocarbyl (i.e. hydrocarbon) solvent, e.g., an aliphatic hydrocarbyl solvent, e.g., solvents comprising mixtures of hydrocarbons. Examples include white spirit and solvents available under the trademarks Shellsol, from Shell Chemicals and Solvesso and Exxsol, from Exxon.

Whilst according to many embodiments of the various aspects of the present invention compositions and formulations are solvent-based, water-based alkyd-based resin formulations and coating compositions are also well known and the compositions and formulations described herein may be water-based (i.e. comprise water as a continuous liquid phase). Accordingly, compositions and formulations described herein may be of alkyd-based resin formulations in the form of emulsions, and may thus comprise a suitable emulsifier, as is well known in the art.

When an alkyd-based composition or formulation is referred to herein as "oxidatively curable", it is to be understood that this term is being used to describe a composition susceptible to the reactions that occur between unsaturated groups (e.g., carbon-carbon double bonds) and oxygen from the air, which reactions constitute oxidative curing and are manifested in hardening and formation of solid coatings obtainable from such compositions or formulations. Thus, an oxidatively curable alkyd-based resin formulation is a formulation capable of oxidative curing, but which has not yet been allowed to cure. The formation of the desired coating resultant from curing may be accelerated through the use of catalytic drying, for example by transition metal-based driers.

A first characteristic feature of the formulation of the invention is that it comprises a chelant capable of chelating at least one transition metal ion through either two or three nitrogen atoms.

As is known, chelants are polydentate ligands capable of coordinating to a single central atom. The chelants described herein are capable of chelating at least one transition metal ion. This is achieved by the formation of coordinate bonds between two or three nitrogen atoms of the chelant and a common transition metal ion, chelation in this context requiring two or three of the nitrogen atoms of the chelant to chelate to the same transition metal ion. The chelants are thus at least bidentate or tridentate. Some of the chelants described herein have a denticity of greater than three, however. For example, some of the chelants described herein are hexadentate, susceptible of coordinating through six nitrogen atoms. With these chelants, however, chelation is nevertheless still achieved by the formation of coordinate bonds between two or three nitrogen atoms and a common transition metal ion; three of the six nitrogen atoms in these hexadentate chelants can chelate to a first transition metal ion and three of these nitrogen atoms can chelate to a second transition metal ion.

These chelants, when contacted with suitable transition metal ions, accelerate the curing of the oxidatively curable formulation of the invention, but in the absence of suitable transition metal ions do not do so.

A second characteristic feature of the formulation of the invention is thus that it is essentially absent transition metal cations to which the chelants can coordinate to form catalytically active metal driers. When transition metal ions are essentially absent the chelants cannot participate in catalytic acceleration of the curing reaction. In accordance with the first aspect of the invention this means that the formulation comprises less than 0.001% by weight of ions of each of manganese, iron, cobalt, vanadium and copper. By this is meant that the formulation of the invention is absent 0.001% by weight manganese ions, absent 0.001% by weight iron ions, absent 0.001% by weight cobalt ions, absent 0.001% by weight vanadium ions and absent 0.001% by weight copper ions.

Accordingly, by being essentially absent a concentration of these transition metal cations, which, if present, form together with the chelant a metal drier capable of accelerating oxidative curing, is meant that there is so little of at least these transition metal ions in the formulation of the invention that catalytic acceleration of the oxidative curing is essentially non-existent. Ideally, the formulation of the invention will be absent any of these transition metal ions. Obviously, however, this is in practice impossible to achieve. Accordingly, the formulation is preferably absent of these transition metal ions to the greatest extent practicable.

Generally, the composition resultant from carrying out the method according to the third aspect of the invention comprises a concentration of one ion selected from manganese, iron, cobalt, vanadium and copper of between about 0.0003 wt % and about 0.07 wt %, for example about 0.0005 wt % and about 0.05 wt %, e.g., between about 0.005 wt % and about 0.05 wt %.

Where percentages by weight are referred to herein (% by weight, wt % or w/w), these mean, unless a context clearly dictates to the contrary, percentages by weight with respect to the binder component (i.e. the alkyd-based resin and any other binders present). With an oxidatively curable alkyd-based coating composition, for example, the combined weights of the binders are those with respect to which weight percentages herein are based. For example, where a composition made according to the third aspect of the invention typically comprises about 0.01% w/w transition metal ions, this is with respect to the weight of the curable components of the composition (i.e. the weight of the binder(s)).

Such concentrations of transition metal ions in the presence of appropriate stoichiometries of the chelants described herein give useful catalytic enhancement of oxidative curing. Accordingly, it is desirable to have concentrations of ions of each of manganese, iron, cobalt, vanadium and copper of less than 0.0003 wt % in the formulation according to the first aspect of the invention, more typically to have concentrations of ions of each of manganese, iron, cobalt, vanadium and copper of less than 0.0001 wt %.

The nature of the chelants present in the formulation of the invention will now be described. It will be understood that this formulation may comprise more than one kind of chelant. Typically, however, the formulation will comprise only one kind of chelant. More typically still, the formulation will comprise only one kind of chelant capable of chelating at least one transition metal ion through three nitrogen atoms.

Where the chelant is capable of chelating at least one transition metal ion through three nitrogen atoms, this is typically a 1,4,7-triazacyclononane-based ligand.

According to particular embodiments, the chelant is of formula (I):

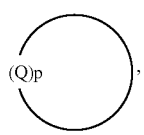

(I)

wherein:

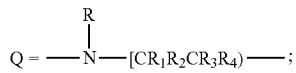

p is 3;
R is independently selected from the group consisting of hydrogen, $C_1$-$C_{24}$alkyl, $CH_2CH_2OH$ and $CH_2COOH$; or one R is linked to the nitrogen atom of another Q of another ring of formula (I) via a $C_2$-$C_6$ alkylene bridge, a $C_6$-$C_{10}$ arylene bridge or a bridge comprising one or two $C_1$-$C_3$ alkylene units and one $C_6$-$C_{10}$ arylene unit, which bridge may be optionally substituted one or more times with independently selected $C_1$-$C_{24}$ alkyl groups; and $R_1$, $R_2$, $R_3$, and $R_4$ are independently selected from H, $C_1$-$C_4$alkyl and $C_1$-$C_4$-alkylhydroxy.

According to particular embodiments, each R is independently selected from the group consisting of hydrogen, $C_1$-$C_{24}$alkyl, $CH_2CH_2OH$ and $CH_2COOH$; or one R is linked to the nitrogen atom of another Q of another ring of formula (I) via an ethylene or a propylene bridge. According to other more specific embodiments, R is independently selected from the group consisting of $C_1$-$C_{24}$alkyl, $CH_2CH_2OH$ and $CH_2COOH$; or one R is linked to the nitrogen atom of another Q of another ring of formula (I) via an ethylene or a propylene bridge. According to other, even more specific, embodiments, each R is independently selected from the group consisting of $C_1$-$C_6$alkyl, in particular methyl; or one R is linked to the nitrogen atom of another Q of another ring of formula (I) via an ethylene or a propylene bridge. Where one R is linked to the nitrogen atom of another Q of another ring of formula (I), this is typically via an ethylene bridge. In such embodiments, the other R groups including those in the other ring of formula (I), are the same, typically $C_1$-$C_6$alkyl, in particular methyl.

According to further particular embodiments, specifically contemplating those particular embodiments described in the immediately preceding paragraph, $R_1$, $R_2$, $R_3$, and $R_4$ are independently selected from hydrogen and methyl, in particular embodiments in which each of $R_1$, $R_2$, $R_3$, and $R_4$ is hydrogen.

When a chelant of formula (I) comprises one group R linked to the nitrogen atom (i.e. N) of another Q of another ring of formula (I) via a bridge as defined, it will be understood that such chelants of formula (I) in particular embodiments comprising an ethylene bridge may alternatively be represented by the following structure:

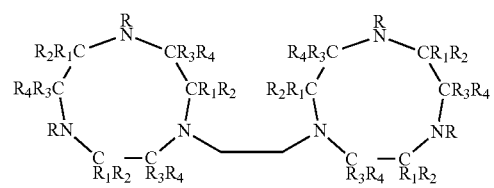

wherein R, $R_1$, $R_2$, $R_3$, and $R_4$ are as herein defined, including the various specific embodiments set out. These are the hexadentate chelants to which reference was made earlier.

Where a bridge is present in the chelants of formula (I) this may be a $C_2$-$C_6$ alkylene bridge. Such alkylene bridges are typically although not necessarily straight chain alkylene bridges as discussed below. They may, however, be cyclic alkylene groups (e.g., the bridge may be cyclohexylene). Where the bridge is a $C_6$-$C_{10}$ arylene bridge, this may be, for example, phenylene or the corresponding arylene formed by abstraction of two hydrogen atoms from naphthalene. Where the bridge comprises one or two $C_1$-$C_3$ alkylene units and one $C_6$-$C_{10}$ arylene unit, such bridges may be, for example, —$CH_2C_6H_4CH_2$— or —$CH_2C_6H_4$—. It will be understood that each of these bridges may be optionally substituted one or more times, for example once, with independently selected $C_1$-$C_{24}$ alkyl (e.g., $C_1$-$C_{18}$ alkyl) groups.

In the chelants of formula (I), the bridge is typically a $C_2$-$C_6$ alkylene bridge. Where this is so, the bridge is typically a straight chain alkylene, e.g., is ethylene, n-propylene, n-butylene, n-pentylene or n-hexylene. According to particular embodiments, the $C_2$-$C_6$ alkylene bridge is ethylene or n-propylene. According to still more particular embodiments, the $C_2$-$C_6$ alkylene bridge is ethylene. Hereinafter, references to propylene are intended to refer to n-propylene (i.e. —$CH_2CH_2CH_2$— rather than —$CH(CH_3)CH_2$—).

According to particular embodiments of the invention, the chelant is 1,4,7-trim ethyl-1,4,7-triazacyclononane ($Me_3$-TACN) or 1,2-bis(4,7-dimethyl-1,4,7-triazacyclonon-1-yl)-ethane ($Me_4$-DTNE). According to still more particular embodiments of the invention, the chelant is $Me_3$-TACN.

Where the chelant is capable of chelating at least one transition metal ion through two nitrogen atoms, this may be, according to particular embodiments, optionally substituted 2,2'-bipyridine and 1,10-phenanthroline. Where substituted, one or more substituents may be present, which can be independently $C_1$-$C_{24}$alkyl or $C_{6-10}$aryl; and/or two adjacent hydrogen atoms can be replaced with a fused benzene ring. In this way, it may be understood that 2,2'-biquinoline is an example of optionally substituted 2,2'-bipyridine. It is further to be understood that any $C_{6-10}$aryl or fused benzene rings may be optionally substituted one or more times, for example once, with independently selected $C_1$-$C_{24}$ alkyl (e.g., $C_1$-$C_{18}$ alkyl) groups. According to particular embodiments, chelants with two nitrogen donor atoms are 2,2'-bipyridine and 1,10-phenanthroline.

It will be understood from this discussion that, according to particular embodiments of the various aspects of the present invention, the nitrogen atoms of the chelants are part of one or more cyclic amines, i.e. in which the coordinating nitrogen atoms are part of a ring, which may be either aliphatic, for example a 1,4,7-triazacyclononane-based chelant, e.g., of formula (I), or aromatic, as in, for example, 2,2'-bipyridine and 1,10-phenanthroline.

Without wishing to be bound to theory, whilst amines are often susceptible to aerial oxidation, use of the 1,4,7-triazacyclononane-based chelants described herein, e.g., of formula (I), can be particularly advantageous since these cyclic triamines show a high stability towards aerial oxidation, which may be attributable to protonation of the 1,4,7-triazacyclononane moieties owing to their very high pKa values (of around 12-13). The protons may be provided by water or protic solvents in solvent- or water-based formulations and compositions, or from moisture in the air. Moreover, the proton is bound/bridged to the three nitrogen donor atoms when protonated because of the structure of the cyclic triamine, which confers still further stability (cf. P Chaudhuri and K Wieghardt, *Prog. Inorg. Chem.*, 35:329 (1987)).

The chelants can be introduced as free amines, typically dissolved in one or more organic solvents, or as protonated salts, such as those described elsewhere (EP 0 902 021 A2 (Clariant GmbH). However, it will be understood that the compositions comprising the chelant and the alkyd-based resin may not collectively comprise an amount of any transition metal cation selected from the group consisting of manganese, iron, cobalt, vanadium and copper ions such that the resultant formulation does not comprise less than 0.001% by weight of each of these ions.

According to embodiments of the present invention, the chelant can be contacted with, e.g., added to, an oxidatively curable alkyd-based binder, typically dissolved in an organic solvent described above when describing solvent-based alkyd-based formulations (or emulsified in a water-based), as described above when describing water-based alkyd-based formulations. The chelant may be added as a pure material to the resin(s), or as a solution. Adding the chelant as a solution can be advantageous in permitting improved and/or easier mixing with the (solution of) binder(s). It may be beneficial to dilute chelant in a suitable solvent before adding to the binder if it is wished to introduce a very small amount of chelant, so greater accuracy of dosing can be achieved. Depending on the properties of the chelant and the desired resin-chelant formulation, suitable solvents include aliphatic hydrocarbons, such as heptanes, water, alcohols, such as ethanol or propylene glycol, or mixtures thereof. The skilled person will be able to easily formulate such solutions, generally using a solvent such as those described above.

Typical concentration ranges of the chelant in the formulation according to the first aspect of the invention are between about 0.0005 and about 5 wt %, often between about 0.001 and about 1 wt %.

It will be understood that a particular benefit of the present invention is the storage stability of the formulation according to the first aspect of the invention. It is contemplated that carrying out the method of the third aspect of the invention will typically not take place contemporaneously with the preparation of the formulation of the invention. Typically, a source of transition metal ions will only be contacted with the formulation of the invention at least 24 hours and more typically at least 48 hours after preparation of the formulation. Typically, a single type of transition metal ion will then be contacted with the formulation of the invention as a transition metal salt, according to the third aspect of the invention, although the formulation may be contacted with more than one type of transition metal ion.

Typically, transition metal ions to which the chelants may coordinate, to provide metal driers that can accelerate curing of the oxidatively curable alkyd-based resin formulations may be, for example manganese, iron, cobalt, vanadium and copper ions, more typically manganese, iron or vanadium ions, or mixtures of any these metal ions. The valency of the metal ions may range from +2 to +5. Where the transition metal ions are of manganese or iron typically they are divalent or trivalent, i.e. where an iron-containing drier is provided, this is usually as an Fe (II) or Fe (III) compound and where a manganese drier is provided, this is usually as a Mn (II) or (III) compound. Where a vanadium-containing drier is provided this is usually as a V(II), (III), (IV) or (V) compound Accordingly, according to the method of the third aspect of the invention, a salt of a manganese or iron ion (or other transition metal ion) typically of a divalent or trivalent redox state, may be contacted with the formulation of the invention to form a desired active metal drier (sometimes referred to herein and in the art as a siccative). Upon contacting the manganese or iron (or other transition metal) salt with the formulation of the invention, in situ formation of manganese- or iron-chelant complexes (or other transition metal-chelant complexes) takes place, which complexes or species formed from them are active as siccatives.

The transition metal salt that is used according to the third aspect of the invention is typically contacted with, e.g., added to, the formulation of the invention at least 24 hours and often at least after 48 hours after preparation of the formulation. The transition metal salts can be contacted with the formulation as a solid, a suspension, or as a solution in a variety of solvents. Typically the salt comprises a manganese (II), manganese (III), iron (II), or iron (III) ion. Such manganese or iron salts can be added as solids, suspensions, or as solutions in a variety of solvents. The invention contemplates use of a mixture of metal salts although a single salt is typically used.

It will be understood that there is no particular limitation as to the source of the transition metal ions. Typically, however, salts are selected from the group consisting of optionally hydrated $MnCl_2$, $FeCl_2$, $FeCl_3$, $MnBr_2$, $Mn(NO_3)_2$, $Fe(NO_3)_3$, $MnSO_4$, $FeSO_4$, $(Fe)_2(SO_4)_3$, $Mn(acetylacetonate)_2$, $Fe(acetylacetonate)_2$, $Mn(acetylacetonate)_3$, $Fe(acetylacetonate)_3$, $Mn(R_5COO)_3$ (including $Mn(acetate)_3$), $Fe(R_5COO)_3$, $Mn(R_5COO)_2$ and $Fe(R_5COO)_2$, wherein $R_5$ is selected from a $C_1$-$C_{24}$ alkyl. Where the salt comprises two or more $R_5$ groups, these can be the same or different. The alkyl moieties, by which is meant saturated hydrocarbyl radicals, may be straight-chain or comprise branched and/or cyclic portions.

Often, the manganese or iron salt is selected from $Mn(R_5COO)_2$ or $Fe(R_5COO)_2$, particularly with $R_5COO(^-)$ being selected from acetate, octanoate, 2-ethylhexanoate, neodecanoate (3,3,5,5-tetram ethylhexanoate), and napthenate. Very often, a manganese salt is used. Particularly often, a manganese salt is used, which, for example is selected from manganese(octanoate)$_2$, manganese(naphthenate)$_2$, manganese(2-ethylhexanoate)$_2$ and manganese (neodecanoate)$_2$. The invention also contemplates use of a mixture of different redox states of the manganese ions with the same counter-ion, for example a mixture of manganese(2-ethylhexanoate)$_2$ and manganese(2-ethylhexanoate)$_3$.

The term optionally hydrated is well known in the art. Metal salts often contain water molecules within a crystal lattice, which will remain present unless the hydrated metals salts are subjected to specific drying steps by heating or drying under reduced pressure. However, partially or fully dehydrated metal salts can also be used. For example, manganese (II) acetate, manganese (II) chloride and iron (II) chloride can be bought as tetrahydrate salts or as dehydrated salts. Iron (III) chloride can be purchased as the anhydrous salt as well as the hexahydrate salt. Commercial manganese sulfate is available in both tetrahydrate and monohydrate forms.

Often these transition metal salts are commercially available as solutions, particularly if they are of the formulae Mn(R$_5$COO)$_2$ or Fe(R$_5$COO)$_2$ described above, for example in hydrocarbon solutions to facilitate dissolution in the solvent-based curable compositions such as paint formulations. However, other solvents may also be used, including alcohols and water (or aqueous solutions), especially for chloride, sulfate and acetate salts of manganese and iron ions.

The typical molar ratio between the metal ions of the metal salt and the chelant is between about 0.1:1 and about 10:1, more typically between about 0.3:1 and about 3:1.

A formulation of the invention can, and generally will, be used in the manufacture of an oxidatively curable coating composition, for example in accordance with the method of the third aspect of the invention. As is known to those of skill in the art, oxidatively curable coating compositions will generally comprise additional components over and above the binder, (the oxidatively curable material, which is predominantly oxidatively curable alkyd resin according to the present invention), an aqueous or non-aqueous solvent/liquid continuous phase and any metal driers intended to accelerate the curing process. Such additional components are generally included so as to confer desirable properties upon the coating composition, such as color or other visual characteristics such as glossiness or mattness), physical, chemical and even biological stability (enhanced biological stability being conferred upon coating compositions by the use of biocides for example), or modified texture, plasticity, adhesion or viscosity.

For example, such optional additional components may be selected from solvents, antioxidants (sometimes referred to as antiskinning agents), auxiliary driers, colorants (including inks and colored pigments), fillers, plasticizers, viscosity modifiers, UV light absorbers, stabilizers, antistatic agents, flame retardants, lubricants, emulsifiers (in particular where an oxidatively curable coating composition or formulation of the invention is aqueous-based), anti-foaming agents, viscosity modifiers, antifouling agents, biocides (e.g., bactericides, fungicides, algaecides and insecticides), anticorrosion agents, antireflective agents, anti-freezing agents, waxes and thickeners. Typically, oxidatively curable coating compositions may be prepared in accordance with the method of the third aspect of the invention will comprise at least one organic solvent, selected from the list of solvents described above and a filler, and generally an antiskinning agent, in addition to the alkyd and optionally other binders and chelant present in the formulation of the invention. The skilled person is familiar with the incorporation of these and other components into oxidatively curable coating composition so as to optimize such compositions' properties.

It will be appreciated that some of these optional additional components possess more than one functional property. For example, some fillers may also function as colorants. The nature of any additional components and the amounts used may be determined in accordance with the knowledge of those of skill in the art and will depend on the application for which the curable coating compositions are intended. Examples are provided below but these are intended to be illustrative, not limitative.

When producing an oxidatively curable coating composition that is ready for use, for example, as a paint, one or more antioxidants (customarily referred to in the art as antiskinning agents) are often included to avoid premature curing of the oxidatively curable coating composition prior to its use. Such premature curing may be manifested by, for example, the formation of a skin on or lumpy matter in the oxidatively curable coating composition as a result of curing during storage, for example hardening of the surface of a paint layer in a can, owing to the activity of the siccative with oxygen on the oxidatively curable binder. Antiskinning agents are understood to reduce skinning by quenching radicals formed and/or by inactivation of drier catalysts by binding to one or more of the coordination sites. Examples include, but are not limited to, methylethylketoxime, acetonoxime, butyraldoxime, methyl-isobutylketoxime, 2-cyclohexylphenol, 4-cyclohexylphenol, t-butyl-hydroquinone, dialkylhydroxylamine, acetylacetonate, ammonia, vitamin E (tocopherol), hydroxylamine, triethylamine, dimethylethanolamine, 2-t-butyl-4-methylphenol, and 2-[(1-methylpropyl)amino]ethanol. According to particular embodiments, the antiskinning agent is selected from the group consisting of methylethylketone-oxime, acetonoxime, butyraldoxime, dialkylhydroxylamine, ammonia, hydroxylamine, triethylamine, dimethylethanolamine, o-cyclohexylphenol, p-cyclohexylphenol and 2-t-butyl-4-methylphenol.

The quantity of antiskinning agent present in an oxidatively curable coating composition is typically between about 0.001 and about 2 wt %. The antioxidant or antiskinning agent may be added to an alkyd-based resin formulation, e.g., of the invention, together with (or separately from) the chelant prior to or during the production of an oxidatively curable coating composition (for example a paint or other coating composition).

Colorants include pigments and inks. Titanium dioxide is a pigment commonly included in many coating compositions, in particular paints.

Fillers may be added to an oxidatively curable coating composition for a number of reasons, for example to bulk out the coating composition and to compare particular properties on the cured composition. Typically, fillers will be inorganic solids that are generally introduced in particulate (finely divided) form. Examples include silica, silicates or clays (for example mica, talc, kaolin), carbonate or other minerals and metal salts or oxides (such as marble, quartzite). Other suitable fillers will be evident to the skilled person.

It will be understood that each of the optional additional components of oxidatively curable coating compositions described herein may be either included within the formulation of the invention, or may be added to such a formulation at or around the same time that transition metal ions are added to such a formulation in order to generate the desired metal drier from the chelant, in accordance with the method according to the third aspect of the invention, or at another time. However, it will be understood that, in particular, the presence of such optional additional components will not materially affect the essential characteristics of the formulation of the invention, since it will be understood that the presence of such customary optional additional components do not serve to accelerate the curing process of the oxidatively curable component(s) within the formulation of the invention.

More particularly, it is to be understood that the essential characteristics of the formulation of the invention are that the oxidatively curable composition is alkyd-based, as discussed above, that the composition comprises one or more chelants as defined herein and that the composition is essentially free of manganese, iron, cobalt, vanadium and copper ions that would serve to form a metal drier together with the chelant.

Accordingly, particular embodiments of the formulation of the invention are constituted by a formulation consisting essentially of an oxidatively curable alkyd-based resin and a chelant capable of chelating at least one transition metal ion through either two or three nitrogen atoms. It will thus be understood that a formulation so defined, which will typically be solvent-based, has common essential characteristics with the formulation defined according to the first aspect of the invention, that is to say it may comprise any of the optional additional components described above, with the proviso that these do not serve to introduce a material concentration of any transition metal ions selected from the group consisting of manganese, iron, cobalt, vanadium and copper ions that would permit generation, in situ, of a materially amount of a catalytically active metal drier.

A formulation of the invention in a suitable solvent or mixture is typically processed to form an oxidatively curable coating composition that is ready for use, for example in accordance with the method of third aspect of the invention. Often, the manufacture of such a coating composition (for example a paint) is carried out after preparation of a formulation of the invention, very often by a different manufacturer. The time from production of the formulation of the invention to production of the final oxidatively curable coating composition (e.g., a paint or ink formulation) will likely be at least 24 hours. It will therefore be appreciated that the storage stability of the formulation of the invention is particularly advantageous.

Whilst the chelant itself does not show drying activity towards the oxidatively curable binders within the formulation of the invention, the source of transition metal ions, such as transition metal ions selected from the group consisting of manganese, iron, cobalt, vanadium and copper ions, for example as a formulation of a manganese or an iron salt or soap, needs to be added to form, in situ, catalytically active complexes that accelerate the curing of the resins. The optimal molar ratio depends on the chelant used. For optionally substituted triazacyclononane-based chelants, e.g., of formula (I), it is expected that one chelating triazacyclononane ring will bind to one metal ion (cf. P Chaudhuri and K Wieghardt, *Prog. Inorg. Chem.*, 35:329 (1987)). Various manganese complexes with 2,2'-bipyridine(bpy) are known that contain two bpy ligands per manganese center. However, various other X-ray structures show other Mn:bpy ratios (cf. R Manchanda, G W Brudvig, R H Crabtree *Coord. Chem.*, 144:1-38 (1995)). Moreover, the molar ratio between the chelant and the transition metal ion, e.g., manganese or iron ion, in the resultant oxidatively curable coating composition may be different from the optimal levels expected. Typical molar ratios of the transition metal ions (e.g., introduced as manganese or iron salts) and chelant are between about 0.1:1 and about 10:1, more typically between about 0.3:1 and about 3:1. Without being bound to theory, an excess of manganese or iron salt may be beneficial to allow some adsorption on solid particles without losing too much siccative activity. On the other hand, a stoichiometric excess of chelant may be beneficial to improve regeneration of catalytically active species during curing, which can lead to improved drying (i.e. curing) performance despite using a lower quantity of transition metal ions. The skilled person will be able to take into account these considerations when preparing oxidatively curable coating compositions.

It may be advantageous if an alkyd resin manufacturer has determined a particular concentration of metal drier that is appropriate for a particular alkyd-based resin formulation for the manufacturer to recommend to users of the formulation an appropriate source of transition metal ions that may be added in order to generate a desired metal drier in situ. Moreover, according to the fourth aspect of the invention, there is provided a kit comprising a formulation of the invention and, separately, a source of suitable transition metal ions, typically manganese, iron, cobalt, vanadium or copper ions, more typically manganese or iron ions, often in the form of a salt such as those described above, for admixture to a formulation of the invention. The kit may optionally comprise instructions or other guidance as to methods according to which the formulation and the transition metal ions may be contacted. In this way, the manufacturer of the formulation can, after optimizing the nature of the source of transition metal ions, for example by the preparation of a particular solution of a particular transition metal ions salt, optimize the manner in which the preparation of an oxidatively curable coating composition, in accordance with the method of the third aspect of the invention, is conducted. The preparation of an oxidatively curable alkyd-based coating composition may be by the manufacturer of such compositions (e.g., a paint manufacturer) or by an end consumer of oxidatively curable alkyd-based coating compositions, who can contact a source of transition metal ions with an otherwise fully formulated oxidatively curable alkyd-based coating composition, It is also within the scope of the current invention that a paint manufacturer, for example, would add commercial metal-soap/chelant mixtures, such as the non-limiting example of Borchers® Dry 0410 (a mixture of bpy with Mn(neodecanoate)$_2$ commercially available from OMG). The additional chelant present in the alkyd resin will improve the drying behavior without causing excessive yellowing which may occur if more of the Mn-soap/ligand mixture is added to the paint formulation.

Additionally, one or more auxiliary driers may be added to the final coating composition, e.g., prepared in accordance with the method of the third aspect of the invention. Such auxiliary driers may be optional additional components within, but are often not present in, the formulation of the invention. Such auxiliary driers include fatty acid soaps of zirconium, bismuth, barium, cerium, calcium, lithium, strontium, and zinc. Typically, fatty acid soaps are optionally substituted octanoates, hexanoates and naphthenates. Without being bound by theory, auxiliary driers (sometimes referred to as through driers) are generally understood to diminish the effect of adsorption of the main drier on solid particles often present in an oxidatively curable coating composition. Other non-metal based auxiliary driers may also be present if desired. These may include, for example, thiol compounds, as described in US 2001/0008932 A1 (Bakkeren et al.) or biomolecules as described in US 2005/0245639 A1 (Oostveen et al.). Concentrations of auxiliary driers within oxidatively curable coating compositions (or formulations of the invention) are typically between 0.01 wt % and 2.5 wt % as is known in the art.

Each and every patent and non-patent reference referred to herein is hereby incorporated by reference in its entirety, as if the entire contents of each reference were set forth herein in its entirety.

The invention may be further understood with reference to the following non-nonlimiting clauses:

1. A formulation comprising an oxidatively curable alkyd-based resin and a chelant capable of chelating at least one transition metal ion through either two or three nitrogen atoms, which formulation comprises less than 0.001% by weight of ions of each of manganese, iron, cobalt, vanadium and copper.

2. The formulation of clause 1, which comprises less than 0.0001% by weight of ions of each of manganese, iron, cobalt, vanadium and copper.

3. The formulation of clause 1 or clause 2, wherein the chelant is present in the formulation at a concentration of between about 0.0005 and about 5 wt % with respect to curable resin.

4. The formulation of clause 1 or clause 2, wherein the chelant is present in the formulation at a concentration of between about 0.001 and about 1 wt % with respect to curable resin.

5. The formulation of any one of clauses 1 to 4, which is a solvent-based formulation.

6. The formulation of any one preceding clause, wherein the chelant is of formula (I):

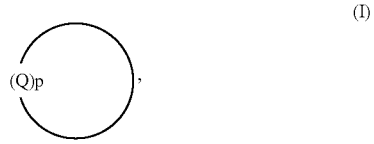

(I)

wherein:

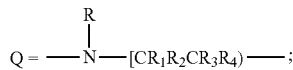

p is 3;

R is independently selected from the group consisting of hydrogen, $C_1$-$C_{24}$alkyl, $CH_2CH_2OH$ and $CH_2COOH$; or one R is linked to the nitrogen atom of another Q of another ring of formula (I) via a $C_2$-$C_6$ alkylene bridge, a $C_6$-$C_{10}$ arylene bridge or a bridge comprising one or two $C_1$-$C_3$ alkylene units and one $C_6$-$C_{10}$ arylene unit, which bridge may be optionally substituted one or more times with independently selected $C_1$-$C_{24}$ alkyl groups; and $R_1$, $R_2$, $R_3$, and $R_4$ are independently selected from: H, $C_1$-$C_4$alkyl, and $C_1$-$C_4$-alkylhydroxy.

7. The formulation of clause 6 wherein each R is independently selected from the group consisting of hydrogen, $C_1$-$C_{24}$alkyl, $CH_2CH_2OH$ and $CH_2COOH$; or one R is linked to the nitrogen atom of another Q of another ring of formula (I) via an ethylene or a propylene bridge.

8. The formation of clause 7 wherein each R is independently selected from the group consisting of $C_1$-$C_6$alkyl, $CH_2CH_2OH$ and $CH_2COOH$; or one R is linked to the nitrogen atom of another Q of another ring the formula (I) via an ethylene or a propylene bridge.

9. The formulation of clause 8 wherein each R is independently selected from the group consisting of $C_1$-$C_6$alkyl; or one R is linked to the nitrogen atom of another Q of another ring the formula (I) via an ethylene or a propylene bridge.

10. The formulation of clause 9 wherein each R is methyl; or one R is linked to the nitrogen atom of another Q of another ring the formula (I) via an ethylene or a propylene bridge.

11. The formulation of clause 10 wherein, where one R is linked to the nitrogen atom of another Q of another ring of formula (I), this is via an ethylene bridge.

12. The formulation of any one of clauses 6 to 10 in which each R is the same.

13. The formulation of any one of clauses 6 to 12 wherein $R_1$, $R_2$, $R_3$, and $R_4$ are independently selected from hydrogen and methyl.

14. The formulation of clause 13 wherein each of $R_1$, $R_2$, $R_3$, and $R_4$ is hydrogen.

15. The formulation of clause 6 wherein the chelant is 1,4,7-trimethyl-1,4,7-triazacyclononane or 1,2-bis(4,7-dimethyl-1,4,7-triazacyclonon-1-yl)-ethane.

16. The formulation of clause 6 wherein the chelant is 1,4,7-trimethyl-1,4,7-triazacyclononane.

17. The formulation of any one of clauses 1 to 5, wherein the chelant is 2,2'-bipyridine or 1,10-phenanthroline.

18. A method of preparing a formulation as defined in any one of clauses 1 to 17, the method comprising contacting a composition comprising an oxidatively curable alkyd-based resin and a composition comprising the chelant.

19. The method of clause 18, wherein the composition comprising the chelant is a solution of chelant dissolved in one or more organic solvents.

20. A method of preparing an oxidatively curable coating composition, comprising contacting a formulation as defined in any one of clauses 1 to 17 with a composition comprising manganese, iron, cobalt, vanadium or copper ions.

21. The method of clause 20, wherein the molar ratio of transition metal ions to chelant is between about 0.1:1 and about 10:1.

22. The method of clause 20, wherein the molar ratio of transition metal ions to chelant is between about 0.3:1 and about 3:1.

23. The method of any one of clauses 20 to 22 wherein the transition metal cations are manganese, iron or vanadium ions.

24. The method of any one of clauses 20 to 22 wherein the transition metal cations are manganese or iron ions.

25. The method of clause 24, wherein the manganese ions are Mn (II) or Mn (III) and the iron ions are Fe (II) or Fe (III).

26. The method of clause 25 wherein the transition metal cations are present in a salt selected from the group consisting of optionally hydrated $MnCl_2$, $FeCl_2$, $FeCl_3$, $MnBr_2$, $Mn(NO_3)_2$, $Fe(NO_3)_3$, $MnSO_4$, $FeSO_4$, $(Fe)_2(SO_4)_3$, $Mn(acetylacetonate)_2$, $Fe(acetylacetonate)_2$, $Mn(acetylacetonate)_3$, $Fe(acetylacetonate)_3$, $Mn(R_3COO)_3$, $Fe(R_5COO)_3$, $Mn(R_5COO)_2$, and $Fe(R_5COO)_2$, wherein $R_5$ is $C_1$-$C_{24}$ alkyl.

27. The method of clause 26 wherein the manganese or iron salt is of formula $Mn(R_5COO)_2$ or $Fe(R_5COO)_2$.

28. The method of clause 26 or clause 27 wherein $R_5COO(^-)$ is selected from acetate, octanoate, 2-ethylhexanoate, neodecanoate (3,3,5,5-tetramethylhexanoate), and naphthenate.

29. The method of any one of clauses 20 to 28 wherein the transition metal cations are manganese cations.

30. The method of clause 29 wherein the manganese cations are present in $MnSO_4$, $MnCl_2$, $MnBr_2$, $Mn(NO_3)_2$, $Mn(CH_3COO)_3$, $Mn(CH_3COO)_2$, $Mn(acetylacetonate)_2$, $Mn(acetylacetonate)_3$, $Mn(octanoate)_2$, $Mn(2$-ethylhexanoate$)_2$ $Mn(naphthenate)_2$, or $Mn(neodecanoate)_2$.

31. The method of any one of clauses 20 to 30, wherein the ions are contacted with the formulation at least 24 hours after preparation of the formulation.

32. A kit comprising a formulation as defined in any one of clauses 1 to 17 and, separately, a composition comprising transition metal ions selected from the group consisting of manganese, iron, cobalt, vanadium and copper ions.

33. The kit of clause 32, wherein the transition metal ions are manganese or iron ions.

34. The kit of clause 33 wherein the transition metal ions are present in a composition as defined in any one of clauses 26 to 30.

The non-limiting examples below more fully illustrate the embodiments of this invention.

EXAMPLES

Alkyd resin (catalogue number A/1552/15; an alkyd resin solution of 70 wt % in white spirits) was obtained from Acros Organics. Manganese (II) 2-ethylhexanoate (abbreviated as $Mn(2$-EH$)_2$ below; catalogue number 93-2532; 40% solution in mineral spirits, 6 wt % Mn) was obtained from Strem Chemicals. Manganese (II) acetate tetrahydrate, manganese (III) acetate dihydrate, and 2,2'-bipyridine were obtained from Aldrich. Manganese chloride tetrahydrate was obtained from Fluka. $Me_3$-TACN (95%) is a product of Catexel Ltd and was obtained as disclosed elsewhere (see U.S. Pat. No. 5,284,944 (Madison et al.). The ligand 1,2-bis-(4,7-dimethyl-1,4,7-triazacyclonon-1-yl)-ethane ($Me_4$-DTNE) was obtained as disclosed in WO2012/003712 (Unilever PLC et al.). $[Mn_2(\mu$-$O)_2(p$-$CH_3COO)(Me_4$-DTNE$)]$ $Cl_2$ was obtained as disclosed in WO2011/106906 Unilever PLC et al., with a purity of 87%). $HMe_3$-$TACN.HSO_4.3H_2O$ has been prepared as disclosed elsewhere (see patent publication EP 0 902 021 A2 (Clariant GmbH)).

X-band ESR spectra were recorded at 77 K on a Bruker ECS 106 instrument, equipped with a Bruker ECS 041 XK microwave bridge and a Bruker 080 magnet.

Example 1

Experiment 1a

To 5 g of alkyd resin was added 0.821 mg $Me_3$-TACN dissolved in 0.05 mL of ethanol. This mixture was stirred manually for ca. 1 minute and stored in a closed vial for 24 h at 30° C. Then, 4.17 mg of $Mn(2$-EH$)_2$ dissolved in 0.10 mL of ethanol was added and the mixture stirred manually for ca. 1 minute. This led to a Mn level of 0.005 wt % in the alkyd resin formulation and a 1:1 molar ratio Mn:$Me_3$-TACN (which is 0.007 wt % Mn with respect to solid resin). Of this mixture 150 mg was spread evenly on 10 $cm^2$ of a glass plate the next day. Dryness of the film was determined every 30 minutes by running a needle through the film. 'Dry' was defined as when the needle could no longer run through the film, but gave wrinkling of the film's surface.

Experiment 1b

Experiment 1a was repeated three times, except that, prior to addition of $Mn(2$-EH$)_2$, the alkyd resin-chelant mixture was stored at 30° C. for 1 week, 4 weeks and 8 weeks.

Experiment 1c

Experiment 1a was repeated, except for increasing the equimolar amounts of $Me_3$-TACN chelant and $Mn(2$-EH$)_2$ so as to obtain 0.01 wt % Mn in the formulation (1.64 mg $Me_3$-TACN dissolved in 0.050 mL of ethanol was added to the resin and the next day 8.34 mg of $Mn(2$-EH$)_2$ dissolved in 0.100 mL ethanol) and 0.02 wt % Mn in the formulation (3.28 mg of the $Me_3$-TACN dissolved in 0.100 mL of ethanol was added to the resin and the next day 16.68 mg of $Mn(2$-EH$)_2$ dissolved in 0.200 mL of ethanol). It should be noted that the quantities of Mn (in wt %) were 0.014 and 0.028 wt % with respect to solid resin respectively. These samples were stored for 4 weeks at 30° C., as described for Experiment 1 b, and compared with freshly prepared samples.

Experiment 1d

Experiment 1a was repeated twice, except that the quantity of $Me_3$-TACN was increased so as to obtain a molar ratios of Mn:$Me_3$-TACN of 1:2 and 1:5 respectively. The amount of $Me_3$-TACN chelant was therefore 1.64 mg (dosed in 0.050 mL of ethanol) and 4.11 mg (dosed in 0.125 mL of ethanol) respectively (with the amount of $Mn(2$-EH$)_2$ stock solution remaining the same as shown in Experiment 1a).

Experiment 1e

Experiment 1a was repeated, except that manganese(II) acetate tetrahydrate was used: 1.12 mg of manganese(II) acetate tetrahydrate dissolved in 0.050 mL ethanol was added to the resin.

Experiment 1f

Experiment 1a was repeated, except that manganese(III) acetate dihydrate was used instead of $Mn(2$-EH$)_2$; 1.22 mg of manganese(III) acetate dihydrate dissolved in 0.050 mL ethanol was added to the resin.

Experiment 1g

Experiment 1a was repeated, except that manganese chloride tetrahydrate was used instead of $Mn(2$-EH$)_2$; to the resin now 0.9 mg of manganese(II) chloride tetrahydrate dissolved in 0.050 mL ethanol was added to the resin.

Experiment 1h

The same experiment as described above (experiment 1a) was repeated, except now $H$-$Me_3$-$TACN.HSO_4.3H_2O$ has been used instead of $Me_3$-TACN: to the resin 1.47 mg of $H$-$Me_3$-$TACN.HSO_4.3H_2O$ dissolved in 0.1 mL ethanol was added.

Comparative experiment 1i—alkyd resin with $Me_3$-TACN

Experiment 1a was repeated, except that no $Mn(2$-EH$)_2$ was added to the resin/$Me_3$-TACN mixture.

Comparative experiment 1j—alkyd resin with manganese (II)(2-ethylhexanoate)$_2$

Experiment 1a was repeated, except that no $Me_3$-TACN chelant was added to the resin (so it only contains the mixture of resin and $Mn(2$-EH$)_2$).

The results of Experiments 1a-1c are shown in Table 1 below:

TABLE 1

Drying times in hours: - various storage times and concentrations of manganese(II)(2-ethylhexanoate)$_2$(Mn(2-EH)$_2$) and Me$_3$-TACN (molar ratio of 1:1)

| Experiment number | Amount of Mn (wt %) | Storage at 30° C.; 1 day | Storage at 30° C.; 1 week | Storage at 30° C.; 4 weeks | Storage at 30° C.; 8 weeks |
|---|---|---|---|---|---|
| 1a, 1b | 0.005 | 2.9 | 3.5 | 3.0 | 3.4 |
| 1c, 1b | 0.01 | 2.6 | N/D | 2.3 | N/D |
| 1c, 1b | 0.02 | 2.5 | N/D | 2.4 | N/D |

(N/D stands for not determined)

The results in Table 1 show that, after storage of the alkyd resin and the chelant for up to 8 weeks at 30° C., drying time obtained after addition of $Mn(2$-EH$)_2$ is essentially unaffected.

The results of Experiments 1d-1j are shown in Table 2 below:

TABLE 2

Drying times in hours (all 0.005 wt % Mn with respect to resin formulation/solution)

| Experiment number | Chelant | Manganese salt | Drying time (h) |
|---|---|---|---|
| 1a | Me$_3$-TACN | Mn(2-EH)$_2$ | 2.9 |
| 1d | Me$_3$-TACN (Mn:Me$_3$-TACN = 1:2) | Mn(2-EH)$_2$ | 2.2 |
| 1d | Me$_3$-TACN (Mn:Me$_3$-TACN = 1:5) | Mn(2-EH)$_2$ | 1.7 |
| 1e | Me$_3$-TACN | Mn(II)(CH$_3$COO)$_2$•4H$_2$O | 3.0 |
| 1f | Me$_3$-TACN | Mn(III)(CH$_3$COO)$_3$•2H$_2$O | 2.8 |
| 1g | Me$_3$-TACN | Mn(II)Cl$_2$•4H$_2$O | 2.7 |
| 1h | HMe$_3$-TACN•HSO4•3H2O | Mn(2-EH)$_2$ | 3.3 |
| 1i | Me$_3$-TACN | None | >8 |
| 1j | None | Mn(2-EH)$_2$ | >8 |

The results in Table 2 show that various manganese salts can be employed to add to the chelant/alkyd resin mixture without affecting the drying time. If either manganese or Me$_3$-TACN is absent, no drying is observed by 8 hours.

Example 2

Comparative Experiment 2a—alkyd resin with Me$_3$-TACN

To 5 g of alkyd resin was added 3.12 mg of Me$_3$-TACN (dosed as a 456 mM stock solution in ethanol) together with 160 µL ethanol. This mixture was stirred manually for ca. 1 minute and was stored in a closed vial overnight. The next day 400 µL ethanol was added. The resultant mixture was stirred manually for ca. 1 minute and was stored in a closed vial overnight. The next day a sample of this mixture was taken and was frozen in liquid nitrogen and its X-band ESR spectrum obtained (see FIG. 1) from which it can be seen that no significant ESR signals are present.

Comparative Experiment 2b—alkyd resin with manganese (II) 2-ethylhexanoate

Figure 2:
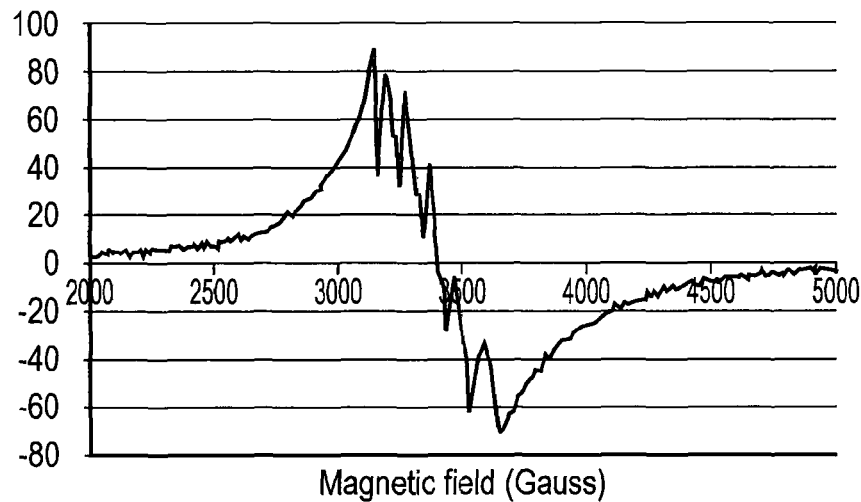
FIG. 2 shows an ESR spectrum of alkyd resin containing Mn(2-EH)$_2$ (see Comparative Example 2b).

To 5 g of alkyd resin was added 200 µl ethanol. This mixture was stirred manually for ca. 1 minute and was stored in a closed vial overnight. The next day 6.20 mg Mn(2-EH)$_2$ (dosed as a 45.4 mM solution in ethanol) was added. The resultant mixture was stirred manually for ca. 1 minute and was stored in a closed vial overnight. The next day a sample of this mixture was taken and was frozen in liquid nitrogen and its X-band ESR spectrum obtained. ESR signals typical for mononuclear manganese(II) carboxylate species were observed, as shown in FIG. 2 (cf. J W de Boer, W R Browne, J Brinksma, P L Alsters, R Hage and B L Feringa, *Inorg. Chem.*, 46, 6353, (2007)).

Experiment 2c—alkyd resin with Me$_3$-TACN and manganese(II) 2-ethylhexanoate (Me$_3$-TACN: Mn 1:1)

Figure 3:
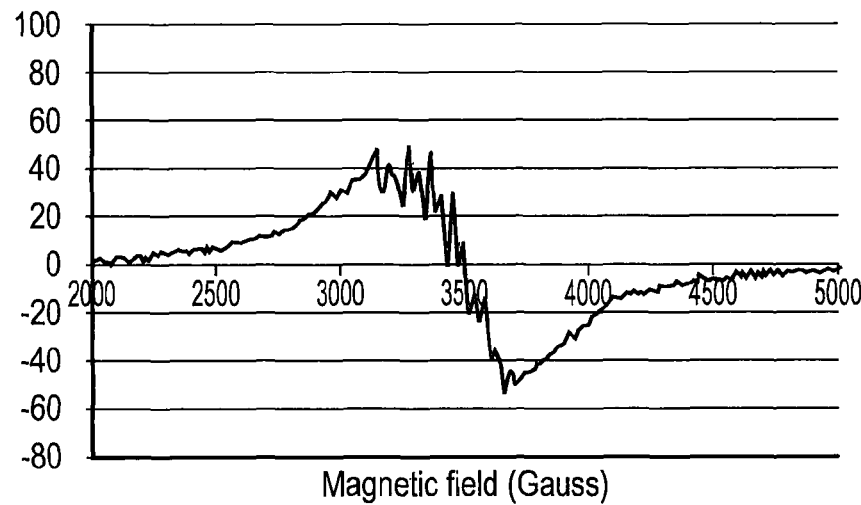
FIG. 3 shows an ESR spectrum of alkyd resin containing Me$_3$-TACN and manganese(II) 2-ethylhexanoate (Me$_3$-TACN: Mn 1:1) (see Example 2c).

To 5 g of alkyd resin was added 3.12 mg of Me$_3$-TACN (dosed as a 456 mM stock solution in ethanol) together with 160 µL ethanol. This mixture was stirred manually for ca. 1 minute and was stored in a closed vial overnight. The next day 6.20 mg Mn(2-EH)$_2$ (dosed as a 45.4 mM stock in ethanol) was added. The resultant mixture was stirred manually for ca. 1 minute and was stored in a closed vial overnight. The next day a sample of this mixture was taken and was frozen in liquid nitrogen and its X-band ESR spectrum was obtained (see FIG. 3). ESR signals typical for dinuclear Mn(II)Mn(II)(Me$_3$-TACN)$_2$ species were observed (cf. A P Golombek and M P Hendrich, *J. Magn. Res.* 165:33, (2003) or J W de Boer, W R Browne, J Brinksma, P L Alsters, R Hage and B L Feringa, *Inorg. Chem.*, 46: 6353 (2007)).

Experiment 2d—alkyd resin with Me$_3$-TACN and manganese(II) 2-ethylhexanoate (Me$_3$-TACN: Mn 2:1)

Figure 4:
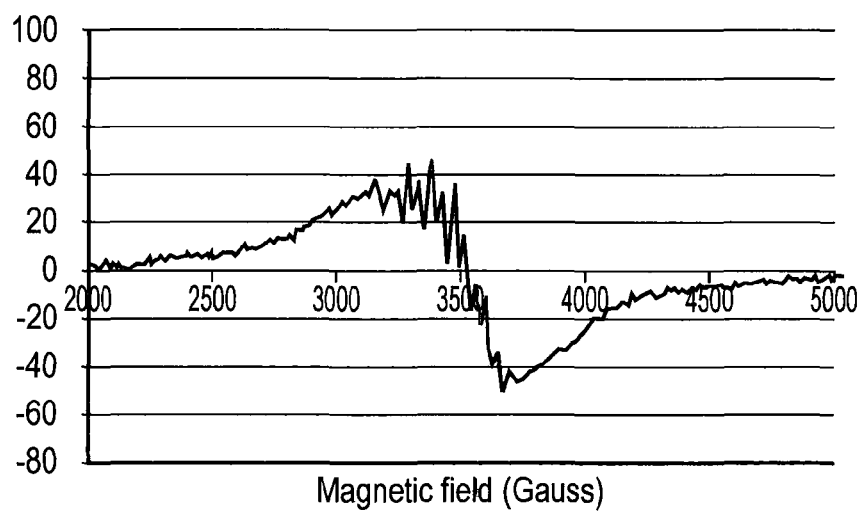
FIG. 4 shows an ESR spectrum of alkyd resin containing Me$_3$-TACN and manganese(II) 2-ethylhexanoate (Me$_3$-TACN: Mn 2:1) (see Example 2d).

To 5 g of alkyd resin was added 6.25 mg of Me$_3$-TACN (as a 456 mM stock solution in ethanol) together with 120 µl ethanol. This mixture was stirred manually for ca. 1 minute and was stored in a closed vial overnight. The next day 6.20 mg manganese(II) 2-ethylhexanoate (as a 45.4 mM stock in ethanol) was added. The resultant mixture was stirred manually for ca. 1 minute and was stored in a closed vial overnight. The next day a sample of this mixture was taken and was frozen in liquid nitrogen and its X-band ESR spectrum was obtained (see FIG. 4). ESR signals typical for Mn(II)Mn(II)(Me$_3$-TACN)$_2$ species were observed (cf. A P Golombek and M P Hendrich, *J. Magn. Res.*, 2003, 165:33-48 or J W de Boer, W R Browne, J Brinksma, P L Alsters, R Hage and B L Feringa, *Inorg. Chem.*, 2007, 46:6353-6372).

Experiment 2e—alkyd resin with Me$_3$-TACN and manganese(II) 2-ethylhexanoate (Me$_3$-TACN: Mn 5:1)

Figure 5:
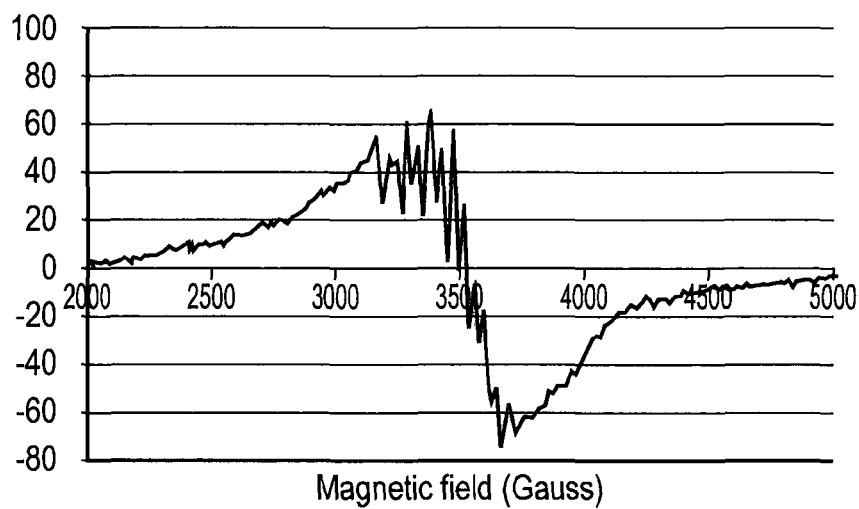
FIG. 5 shows an ESR spectrum of alkyd resin containing Me$_3$-TACN and manganese(II) 2-ethylhexanoate (Me$_3$-TACN: Mn 5:1) (see Example 2e).

To 5 g of alkyd resin was added 15.6 mg of Me$_3$-TACN (as a 456 mM stock solution in ethanol). This mixture was stirred manually for ca. 1 minute and was stored in a closed vial overnight. The next day 6.20 mg manganese(II) 2-ethylhexanoate (as a 45.4 mM stock in ethanol) was added. The resultant mixture was stirred manually for ca. 1 minute and was stored in a closed vial overnight. The next day a sample of this mixture was taken and was frozen in liquid nitrogen and its X-band ESR spectrum obtained (see FIG. 5). ESR signals typical for Mn(II)Mn(II)(Me$_3$-TACN)$_2$ species were observed (cf. A P Golombek and M P Hendrich, *J. Magn. Res.*, 2003, 165:33-48 or J W de Boer, W R Browne, J Brinksma, P L Alsters, R Hage and B L Feringa, *Inorg. Chem.*, 2007, 46:6353-6372).

Experiment 2f—alkyd resin with Me$_3$-TACN and manganese(III) acetate dihydrate (Me$_3$-TACN: Mn 1:1)

Figure 6:
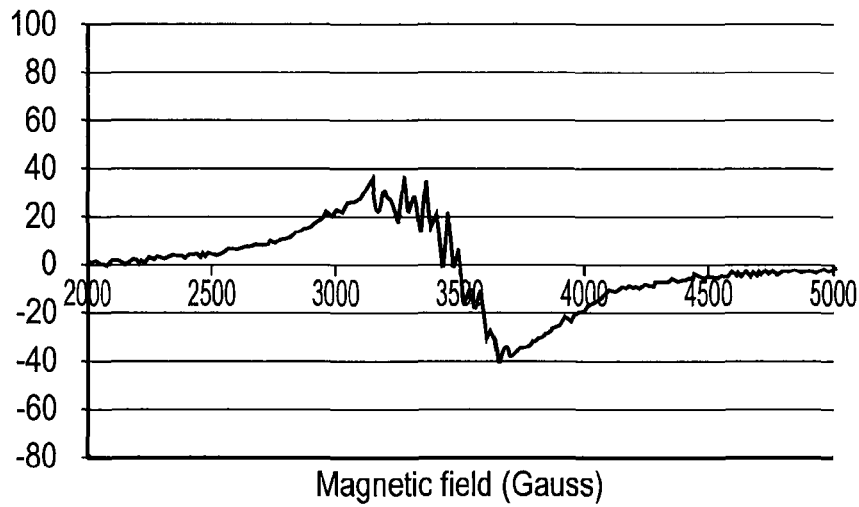
FIG. 6 shows an ESR spectrum of alkyd resin containing Me$_3$-TACN and manganese(III) acetate dihydrate (Me$_3$-TACN: Mn 1:1) (see Example 2f).

To 5 g of alkyd resin was added 3.12 mg of Me$_3$-TACN (as a 456 mM stock solution in ethanol) together with 160 µl ethanol. This mixture was stirred manually for ca. 1 minute and was stored in a closed vial overnight. The next day 4.87 mg manganese(III) acetate dihydrate (as a 45.4 mM stock solution in ethanol) was added. The resultant mixture was stirred manually for ca. 1 minute and was stored in a closed vial overnight. The next day a sample of this mixture was taken and was frozen in liquid nitrogen and its X-band ESR spectrum was obtained (see FIG. 6). ESR signals typical for Mn(II)Mn(II)(Me$_3$-TACN)$_2$ species were observed (cf. A P Golombek and M P Hendrich J. Magn. Res., 2003, 165, 33-48 or J W de Boer, W R Browne, J Brinksma, P L Alsters, R Hage and B L Feringa, *Inorg. Chem.*, 2007, 46, 6353-6372).

The results of the Comparative Experiments 2a and 2b and Experiments 2c-2f clearly indicate that Mn-Me$_3$-TACN complexes are formed in alkyd resin which is pre-mixed with Me$_3$-TACN chelant under the conditions disclosed herein. In each of Experiments 2c-2f, the ESR spectrum obtained (see FIGS. 3-6) indicates the presence of Mn(II) ions that are not part of the Mn(II)Mn(II)(Me$_3$-TACN)$_2$ species. Analysis, if desired, can be readily undertaken to quantify the concentration of Mn(II)Mn(II)(Me$_3$-TACN)$_2$ and/or molar ratio of Mn(II)Mn(II)(Me$_3$-TACN)$_2$ species and Mn(II) ions that are not part of the Mn(II)Mn(II)(Me$_3$-TACN)$_2$ species.

Furthermore, there is a clear correlation between the formation of Mn-Me$_3$-TACN complexes and the observed drying rate of resin/manganese/chelant mixtures prepared under the conditions disclosed in this invention (see also Example 1).

Example 3

Experiment 3a

To 5 g of alkyd resin was added 14.2 mg 2,2'-bipyridine dissolved in 0.05 mL ethanol. This mixture was stirred manually for ca. 1 minute and was stored in a closed vial for 8 hours at room temperature. Then, 41.67 mg of Mn(2-EH)$_2$ (not diluted in ethanol) was added and the mixture was stirred manually for ca. 1 minute. This led to a Mn level of 0.05 wt % with respect to resin solution (or 0.07 wt % with respect to solid resin) and a 1:2 molar ratio Mn:bipyridine. The next day, 150 mg of this mixture was spread evenly on 10 cm$^2$ of a glass plate. Dryness of the film was determined every 30 minutes by running a needle through the film. 'Dry' was defined when the needle could no longer run through the film, but gave wrinkling of the film's surface. A drying time of 3.5 h was measured.

Comparative Experiment 3b 14.2 mg 2,2'-bipyridine dissolved in 0.05 mL ethanol was mixed with 41.67 mg Mn(2-EH)$_2$ and left in a closed vial for 8 hours at room temperature (a 1:2 molar ratio Mn:bipyridine was present in the solution). Then 5 g of alkyd resin was added and the mixture was stirred manually for ca. 1 minute. This led to a Mn level of 0.05 wt % with respect to resin solution (or 0.07 wt % with respect to solid resin). The next day, 150 mg of this mixture was spread evenly on 10 cm$^2$ of a glass plate. Dryness of the film was determined every 30 minutes by running a needle through the film. 'Dry' was defined when the needle could no longer run through the film, but gave wrinkling of the film's surface. A drying time of 3.5 h was measured.

Comparative Experiment 3c

Experiment 3b was repeated except that no 2,2'-bipyridine was added to the resin and Mn(2-EH)$_2$. No drying was observed by 8 h.

The results of Experiment 3a and Comparative Experiments 3b and 3c show that, upon mixing 2,2'-bipyridine and resin prior the addition of manganese (II) (2-ethylhexanoate)$_2$ (Mn-2EH)$_2$, a similar paint drying behavior was observed (Experiment 3a) as when first 2,2'-bipyridine was first mixed with Mn(2-EH)$_2$ for 8 h after which the resin was added (Experiment 3b). Further, no drying was observed under these conditions in the absence of 2,2'-bipyridine (Experiment 3c), showing that in Experiment 3a and Comparative Example 3b active manganese-2,2'-bipyridine species were formed.

Experiment 4a

To 5 g of alkyd resin was added 16.8 mg Me$_4$-DTNE dissolved in 0.10 mL ethanol. This mixture was stirred manually for ca. 1 minute and was stored in a closed vial overnight at room temperature. Then, 41.67 mg of Mn(2-EH)$_2$ was added and the mixture was stirred manually for ca. 1 minute. This led to a Mn level of 0.05 wt % with respect to resin solution (or 0.07 wt % with respect to solid resin) and a 1:1 molar ratio Mn:Me$_4$-DTNE. The next day, 150 mg of this mixture was spread evenly on 10 cm$^2$ of a glass plate. Dryness of the film was determined every 30 minutes by running a needle through the film. 'Dry' was defined when the needle could no longer run through the film, but gave wrinkling of the film's surface. A drying time of 1.2 h was measured.

Experiment 4b

To 5 g of alkyd resin was added 8.4 mg Me$_4$-DTNE dissolved in 0.10 mL ethanol. This mixture was stirred manually for ca. 1 minute and was stored in a closed vial overnight at room temperature. Then, 41.67 mg of Mn(2-EH)$_2$ (not diluted in ethanol) was added and the mixture was stirred manually for ca. 1 minute. This led to a Mn level of 0.05 wt % with respect to resin solution (or 0.07 wt % with respect to solid resin) and a 2:1 molar ratio Mn:Me$_4$-DTNE. The next day, 150 mg of this mixture was spread evenly on 10 cm$^2$ of a glass plate. Dryness of the film was determined every 30 minutes by running a needle through the film. 'Dry' was defined when the needle could no longer run through the film, but gave wrinkling of the film's surface. A drying time of 1.9 h was measured.

Experiment 4c

To 5 g of alkyd resin was added 3.4 mg Me$_4$-DTNE dissolved in 0.04 mL ethanol. This mixture was stirred manually for ca. 1 minute and was stored in a closed vial overnight at room temperature. Then, 8.3 mg of Mn(2-EH)$_2$ (not diluted in ethanol) was added and the mixture was stirred manually for ca. 1 minute. This led to a Mn level of 0.01 wt % with respect to resin solution (or 0.014 wt % with respect to solid resin) and a 1:1 molar ratio Mn:Me$_4$-DTNE. The next day, 150 mg of this mixture was spread evenly on 10 cm$^2$ of a glass plate. Dryness of the film was determined every 30 minutes by running a needle through the film. 'Dry' was defined when the needle could no longer run through the film, but gave wrinkling of the film's surface. A drying time of 3 h was measured.

Experiment 4d

To 5 g of alkyd resin was added 1.7 mg Me$_4$-DTNE dissolved in 0.02 mL ethanol. This mixture was stirred manually for ca. 1 minute and was stored in a closed vial overnight at room temperature. Then, 8.3 mg of Mn(2-EH)$_2$ (not diluted in ethanol) was added and the mixture was stirred manually for ca. 1 minute. This led to a Mn level of 0.01 wt % with respect to resin solution (or 0.014 wt % with respect to solid resin) and a 2:1 molar ratio Mn:Me$_4$-DTNE. The next day, 150 mg of this mixture was spread evenly on 10 cm$^2$ of a glass plate. Dryness of the film was determined every 30 minutes by running a needle through the film. 'Dry' was defined when the needle could no longer run through the film, but gave wrinkling of the film's surface. A drying time of 3.7 h was measured.

Experiment 4e

Experiment 4a was repeated, except that manganese(II) acetate tetrahydrate was used instead of Mn(2-EH)$_2$: 11.2 mg of manganese(II) acetate tetrahydrate dissolved in 0.3 mL ethanol was added to the resin. A drying time of 1.2 h was measured.

Experiment 4f

Experiment 4a was repeated, except that manganese(III) acetate dihydrate was used instead of Mn(2-EH)$_2$; 12.2 mg of manganese(III) acetate dihydrate dissolved in 0.3 mL ethanol was added to the resin. A drying time of 1.1 h was measured.

Experiment 4g

Experiment 4a was repeated, except that manganese chloride tetrahydrate was used instead of Mn(2-EH)$_2$; to the resin now 9.0 mg of manganese(II) chloride tetrahydrate dissolved in 0.3 mL ethanol was added to the resin. A drying time of 1.1 h was measured.

Experiment 4h (comparative)

To 5 g of alkyd resin was added 16.0 mg Mn$_2$(μ-O)$_2$(μ-CH$_3$COO)(Me$_4$-DTNE)]Cl$_2$ dissolved in 0.2 mL ethanol. This led to a Mn level of 0.05 wt % with respect to resin solution (or 0.07 wt % with respect to solid resin). This mixture was stirred manually for ca. 1 minute and was stored in a closed vial overnight at room temperature. The next day, 150 mg of this mixture was spread evenly on 10 cm² of a glass plate. Dryness of the film was determined every 30 minutes by running a needle through the film. 'Dry' was defined when the needle could no longer run through the film, but gave wrinkling of the film's surface. A drying time of 4.8 h was measured.

The results of Experiment 4a, 4b, 4c, 4d and Comparative Experiment 4h show that the presence of Me$_4$dtne either dosed together with Mn(2-EH)$_2$ (experiments 4a-4d) or as a well-defined dinuclear complex (experiment 4h) yield a significantly improved paint drying activity as compared to Mn(2-EH)$_2$ only (experiment 3c).

Further comparing the results of mixing Me$_4$dtne ligand with Mn(2-EH)$_2$ with experiment 4h (using the well-defined preformed complex with Me$_4$dtne) shows that the drying time of the Me$_4$dtne ligand/Mn(2-EH)$_2$ mixture is significantly faster than that found for the well-defined complex. For example experiment 4b and 4h (both having 0.05% Mn in the formulation and a Mn:L molar ratio of 2:1) gave a drying time of 1.9 h and in experiment 5 of 4.8 h. Even reducing the amount of Mn and Me$_4$dtne ligand in experiment by a factor of 5 (to 0.01% Mn) yielded a better drying time (3.7h) than found for the well-defined complex at a Mn level of 0.05%.

The data also show that using a Mn:L molar ratio of 1:1 gave a better drying time than using a Mn:L molar ratio of 2:1 (experiments 4a vs 4b yielding 1.2 h vs 1.9 h respectively when using the same amount of Mn (0.05%). Similarly experiments 4c vs 4d give the same trends at 0.01% (3 h and 3.7 h).

Finally, the results shown in experiments 4e, 4f and 4g show that in combination with the Me$_4$dtne ligand, a similar drying time of the alkyd resin is obtained irrespective of the Mn salt used (being Mn(2-EH)$_2$, Mn(acetate)$_2$, Mn(acetate)$_3$, or MnCl$_2$).

The invention claimed is:

1. A method of preparing an oxidatively curable coating composition, comprising contacting a formulation with a composition comprising manganese, iron, or vanadium ions, so that the composition comprises a concentration of between about 0.0003 wt % and about 0.07 wt %, of one ion selected from manganese, iron and vanadium ions,
wherein said formulation comprises:
   (1) an oxidatively curable alkyd-based resin,
   (2) less than 0.0001% by weight of ions of each of manganese, iron, cobalt, vanadium and copper, and,
   (3) a chelant capable of chelating at least one transition metal ion through either two or three nitrogen atoms, wherein said chelant has a concentration, with respect to said oxidatively curable alkyd-based resin, of between about 0.0005 and about 5 wt %, and is of formula (I):

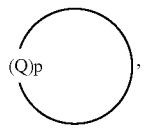

(I)

wherein:

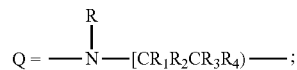

p is 3;
R is independently selected from the group consisting of hydrogen, C$_1$-C$_{24}$alkyl, CH$_2$CH$_2$OH and CH$_2$COOH; or one R is linked to the nitrogen atom of another Q of another ring of formula (I) via a C$_2$-C$_6$ alkylene bridge, a C$_6$-C$_{10}$ arylene bridge or a bridge comprising one or two C$_1$-C$_3$ alkylene units and one C$_6$-C$_{10}$ arylene unit, which bridge may be optionally substituted one or more times with independently selected C$_1$-C$_{24}$ alkyl groups; and,
R$_1$, R$_2$, R$_3$, and R$_4$ are independently selected from: H, C$_1$-C$_4$alkyl, and C$_1$-C$_4$-alkylhydroxy.

2. The method of claim 1, wherein the molar ratio of said manganese, iron, or vanadium ions to said chelant is between about 0.1:1 and about 10:1.

3. The method of claim 1, wherein said manganese, iron, or vanadium ions are manganese or iron ions.

4. The method of claim 3 wherein said manganese or iron ions are present in a salt selected from the group consisting of optionally hydrated MnCl$_2$, FeCl$_2$, FeCl$_3$, MnBr$_2$, Mn(NO$_3$)$_2$, Fe(NO$_3$)$_3$, MnSO$_4$, FeSO$_4$, (Fe)$_2$(SO$_4$)$_3$, Mn(acetylacetonate)$_2$, Fe(acetylacetonate)$_2$, Mn(acetylacetonate)$_3$, Fe(acetylacetonate)$_3$, Mn(R$_5$COO)$_3$, Fe(R$_5$COO)$_3$, Mn(R$_5$COO)$_2$, and Fe(R$_5$COO)$_2$, wherein R$_5$ is C$_1$-C$_{24}$ alkyl.

5. The method of claim 4, wherein the manganese or iron ions are manganese ions present in MnSO$_4$, MnCl$_2$, MnBr$_2$, Mn(NO$_3$)$_2$, Mn(CH$_3$COO)$_3$, Mn(CH$_3$COO)$_2$, Mn(acetylacetonate)$_2$, Mn(acetylacetonate)$_3$, Mn(octanoate)$_2$, Mn(2-ethylhexanoate)$_2$, Mn(naphthenate)$_2$ or Mn(neodecanoate)$_2$.

6. The method of claim 1, wherein the formulation comprises between about 0.001 and about 1 wt %, with respect to said oxidatively curable alkyd-based resin, of the chelant.

7. The method of claim 1, wherein each R is independently selected from the group consisting of hydrogen, C$_1$-C$_6$alkyl, CH$_2$CH$_2$OH and CH$_2$COOH; or one R is linked to the nitrogen atom of another Q of another ring of formula (I) via an ethylene or a propylene bridge.

8. The method of claim 1, wherein each of R$_1$, R$_2$, R$_3$, and R$_4$ is hydrogen.

9. The method of claim 1, wherein the chelant is 1,4,7-trimethyl-1,4,7-triazacyclononane or 1,2-bis(4,7-dimethyl-1,4,7-triazacyclonon-1-yl)-ethane.

10. The method of claim 1, wherein the chelant is 1,4,7-trimethyl-1,4,7-triazacyclononane.

11. The method of claim 1, wherein the concentration of the manganese, iron or vanadium ions in the composition is between about 0.0005 wt % and about 0.05 wt %.

12. The method of claim 1, wherein the concentration of the manganese, iron or vanadium ions in the composition is between about 0.005 wt % and about 0.05 wt %.

* * * * *